(12) United States Patent
Mazard et al.

(10) Patent No.: US 9,438,726 B2
(45) Date of Patent: Sep. 6, 2016

(54) ENTERPRISE PHONE THAT CAN PROVIDE PROFESSIONAL SERVICES DURING A COMMUNICATION SET UP ON A PRIVATE CELLULAR PHONE

(71) Applicant: Alcatel Lucent, Boulogne Billancourt (FR)

(72) Inventors: Cyril Mazard, Oberhaslach (FR); Bruno Wilsius, Strasbourg (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/758,304

(22) PCT Filed: Jan. 31, 2014

(86) PCT No.: PCT/EP2014/051907
§ 371 (c)(1),
(2) Date: Jun. 29, 2015

(87) PCT Pub. No.: WO2014/127973
PCT Pub. Date: Aug. 28, 2014

(65) Prior Publication Data
US 2015/0350424 A1 Dec. 3, 2015

(30) Foreign Application Priority Data
Feb. 25, 2013 (EP) .................................... 13305210

(51) Int. Cl.
*H04M 1/00* (2006.01)
*H04M 3/42* (2006.01)
(Continued)

(52) U.S. Cl.
CPC .......... *H04M 3/42263* (2013.01); *H04M 3/58* (2013.01); *H04W 4/008* (2013.01); *H04W 4/16* (2013.01); *H04M 2203/2094* (2013.01); *H04M 2207/206* (2013.01); *H04M 2250/02* (2013.01); *H04M 2250/06* (2013.01); *H04W 88/06* (2013.01)

(58) Field of Classification Search
USPC ................ 455/552.1, 41.1–41.3, 555, 556.1, 455/550.1
See application file for complete search history.

(56) References Cited

U.S. PATENT DOCUMENTS 8,849,348 B2* 9/2014 Xiao ................. H04M 1/72572
455/406
2006/0205392 A1* 9/2006 Jagadeesan ....... H04M 3/42153
455/414.1

(Continued)

FOREIGN PATENT DOCUMENTS

| EP | 1799007 | 6/2007 |
|---|---|---|
| EP | 2479969 | 7/2012 |

(Continued)

*Primary Examiner* — Fayyaz Alam
(74) *Attorney, Agent, or Firm* — Patti & Malvone Law Group, LLC

(57) ABSTRACT

A technique is provided for an enterprise phone to provide professional services during a communication set up in a mobile network on a private cellular phone. The technique includes a first user agent coupled to a communication server of an enterprise communication network to represent the enterprise phone as a terminal of the enterprise communication network, a classical audio interface coupled to the first user agent, and a first wireless transmitter-receiver to communicate with a second wireless transmitter-receiver embedded in the private cellular phone. A second user agent, coupled to the first wireless transmitter-receiver and to the communication server, represents a private cellular phone as a virtual terminal of the enterprise communication network. The second user agent requests a set up of a second communication between itself and the first user agent so that a mobile communication already set up on the private cellular phone is connected to the enterprise phone.

5 Claims, 2 Drawing Sheets

(51) Int. Cl.
*H04W 4/00* (2009.01)
*H04W 4/16* (2009.01)
*H04M 3/58* (2006.01)
*H04W 88/06* (2009.01)

(56) References Cited

U.S. PATENT DOCUMENTS

| | | | |
|---|---|---|---|
| 2006/0256751 A1* | 11/2006 | Jagadeesan | H04L 29/06027 370/331 |
| 2011/0177818 A1 | 7/2011 | Heit et al. | |
| 2012/0069754 A1* | 3/2012 | Marsh | H04W 36/0066 370/252 |
| 2013/0029648 A1* | 1/2013 | Soundrapandian | H04M 1/7253 455/416 |
| 2013/0225233 A1* | 8/2013 | Elter | H04M 1/2535 455/552.1 |

FOREIGN PATENT DOCUMENTS

| | | |
|---|---|---|
| EP | 2498484 | 9/2012 |
| WO | 2009115560 | 9/2009 |

\* cited by examiner

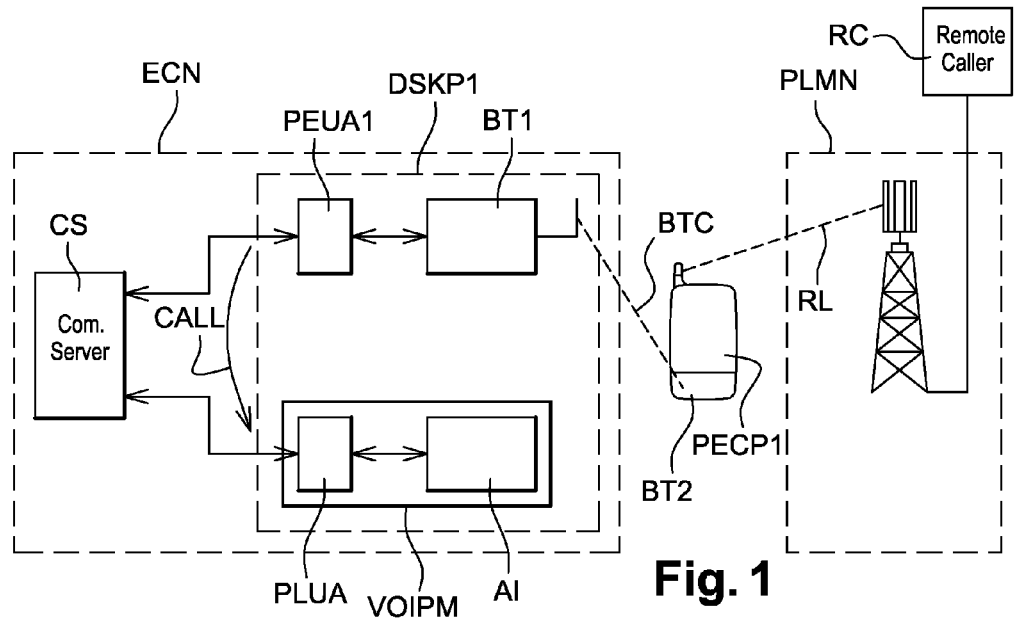
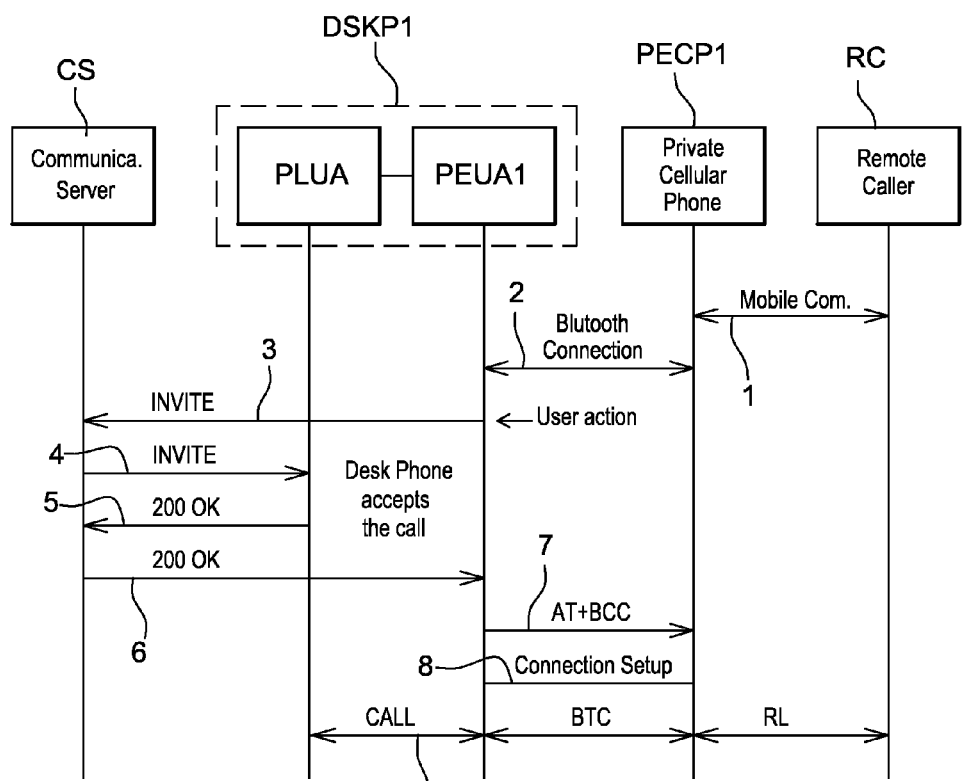

ENTERPRISE PHONE THAT CAN PROVIDE PROFESSIONAL SERVICES DURING A COMMUNICATION SET UP ON A PRIVATE CELLULAR PHONE

FIELD OF THE INVENTION

The present invention generally relates to an enterprise phone that can provide professional services during a communication already set up on a private cellular phone.

BACKGROUND OF THE INVENTION

In an office, each employee is generally the user of a professional phone that is generally a desk phone. However he/she may receive a professional call on his/her private cellular phone. When answering a professional call on a private cellular phone, an employee cannot benefit of the acoustic quality of his/her professional desk phone (In particular the quality of the hands-free function) and cannot benefit of the service level of the enterprise communication system to which his/her professional desk phone is connected to.

When answering a professional call on a private cellular phone, an employee will not:
Be seen as busy by his colleagues.
Be able to use the enterprise directory to make a second call.
Be able to transfer the call to a colleague.
etc . . .

DESCRIPTION OF THE PRIOR ART

The existing solutions consist in:
Transferring the mobile communication to the professional desk phone by using a service of the cellular network.
Calling back the caller, by means of the desk phone.
Begging the caller to call again, on the number of the desk phone.
Refraining of communicating a private number to other people, i. e. only communicating the employee's business number; and using a service of the enterprise communication system that enables to forward incoming calls, addressed to the business number, both to a private cellular phone and to a desk phone, in order to take the call on the cellular phone when the user is not in the neighborhood of the desk phone, or to take the call on the desk phone when the user is in the neighborhood of the desk phone.
These known solutions have drawbacks:
Transferring the call by using the cellular network services requires subscribing to a transfer service at the operator (It implies fees). The employee must warn the caller that he/she is going to transfer the call. This is not seamless, so it is not really possible in a business context.
Calling back the caller, by means of the desk phone, requires that the employee warns the caller that he/she is going to call back. This is not seamless, so it is not really possible in a business context.
Only communicating a business number; and forwarding incoming calls, received on the business number, both to a private cellular phone and to a desk phone, requires that the enterprise communication system be configured beforehand to do this forwarding.

The purpose of the invention is to switch the communication from the private cellular phone to the professional desk top phone seamlessly and with the same service level as if the call was originally addressed to the professional desk phone.

This can be reached by using, the phone according to the invention.

SUMMARY OF THE INVENTION

The object of the invention is an enterprise phone that can provide professional services during a communication set up in a mobile network on a private cellular phone, comprising:
a first user agent that can be coupled to a communication server of an enterprise communication network for representing the enterprise phone as a terminal of this enterprise communication network;
a classical audio interface (AI) coupled to the first user agent; characterized in that it further comprises:
a first wireless transmitter-receiver that can communicate with a second wireless transmitter-receiver embedded in a private cellular phone;
a second user agent coupled to the first wireless transmitter-receiver, and that can be coupled to a communication server for representing a private cellular phone as a virtual terminal of the enterprise communication network, and that can request the set up of a second communication between itself and the first user agent so that a mobile communication already set up on said private cellular phone is connected to the enterprise phone.

Thanks to the wireless transmitter-receiver embedded in the cell phone and the wireless transmitter-receiver embedded in the enterprise phone, a communication set up in a mobile network on a private cellular phone can be extended up to the second user agent that represents the private cell phone. On user action, the second user agent can request the set up of a second call between itself and the first user agent, by means of the communication server. The first user agent that represents the enterprise phone, automatically and silently answers this second call. This second call is set up for extending the communication already set up on the private cellular phone up to the enterprise phone. The user can then continue the call on the enterprise phone and so benefits of the services provided by the enterprise phone and the communication server.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 1 is a block diagram showing an exemplary enterprise communication network comprising a first embodiment of the phone according to the invention, comprising a Bluetooth transmitter-receiver.

FIG. 2 shows a signaling flow for an exemplary enterprise communication network when it comprises this first embodiment of the phone according to the invention.

DETAILED DESCRIPTION OF THE PREFERRED EMBODIMENTS

Figure 3:
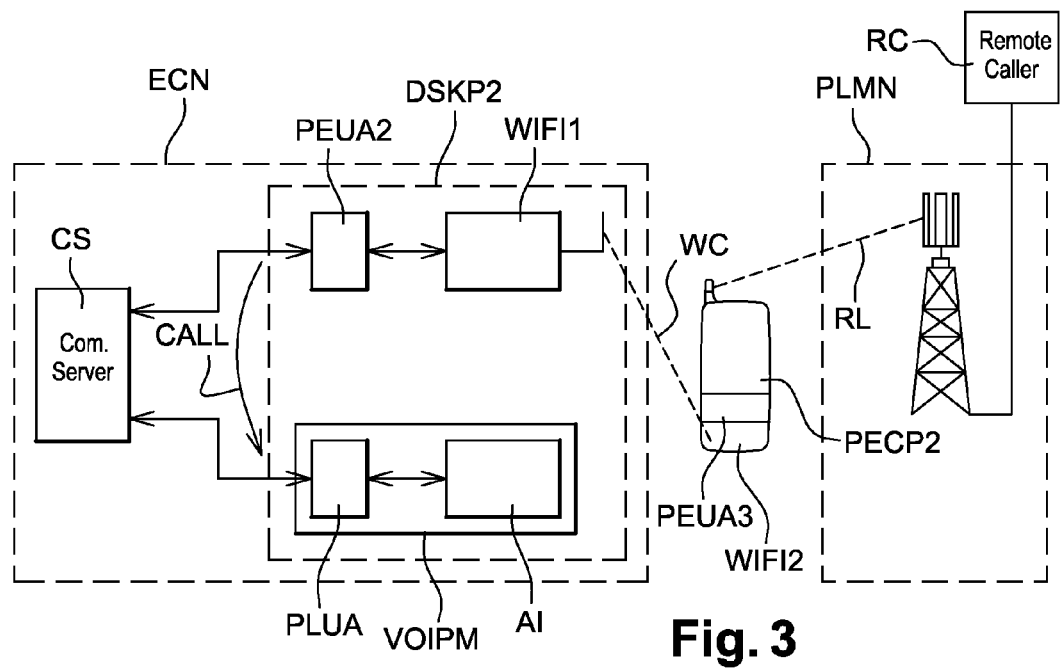
FIG. 3 is a block diagram showing an exemplary enterprise communication network comprising a second embodiment of the phone according to the invention, comprising a WiFi access point.

On FIG. 1, the exemplary enterprise communication network ECN comprises a communication server CS and at least one terminal that is a first embodiment of the enterprise phone according to the invention. This first embodiment is a professional desk phone DSKP1 comprising:

- Classical means VOIPM for establishing a phone call over the Internet protocol, these means comprising a classical audio interface AI and a professional desk phone user agent PLUA that represents the professional desk phone DSKP1 from the communication server CS point of view. All calls addressed to the professional desk phone DSKP1 are sent to this user agent PLUA.
- A Bluetooth transmitter-receiver BT1 supporting the Bluetooth hands-free profile (as described in Bluetooth standard specification). For instance, the professional desk phone DSKP1 is a wired desk phone, but it could also be a cordless desk phone. This Bluetooth transmitter-receiver BT1 is coupled to the classical means VOIPM for establishing a phone call over the Internet protocol.
- A private cellular phone user agent PEUA1 that can represent any private cellular phone as a virtual terminal of the enterprise communication network ECN, from the communication server CS point of view.

The communication server CS and the professional desk phone DSKP1 use the session initiation protocol (SIP) as a signaling protocol.

The user of the professional desk phone DSKP1 is also the user of a private cell phone PECP1 comprising a Bluetooth transmitter-receiver BT2 supporting the Bluetooth hands-free profile. This cellular phone PECP1 is connected by a radio link RL to a public land mobile network PLMN comprising base stations BS. In this example, the private cellular phone user agent PEUA1 represents the private cellular phone PECP1.

Initially the user of the private cell phone PECP1 is in a communication with a remote caller RC, via the radio link RL and the mobile network PLMN. The user is going to his/her office.

When the user arrives at his/her office, a Bluetooth connection with his/her professional desk phone DSKP1 becomes possible. The user interface of the desk phone DSKP1 displays an indication proposing, to the user, a Bluetooth connection with the cellular phone PECP1. The user associates the Bluetooth transmitter-receiver BT1 of the professional desk phone DSKP1 and the Bluetooth transmitter-receiver BT2 of the cell phone PECP1. They both implement the Bluetooth Hands-Free profile. The professional desk phone DSKP1 plays the role of a hands-free unit and the private cellular phone PECP1 plays the role of an audio gateway enabling the access to the remote caller RC via the mobile network PLMN.

When acknowledging the Bluetooth hands-free activation, the private cellular phone user agent PEUA1 establishes a SIP call CALL to the desk phone user agent PLUA by means of the communication server CS. The desk phone user agent PLUA automatically and silently accepts the call.

The SIP media negotiation between the private cellular phone user agent PEUA1 and the desk phone user agent PLUA starts a Bluetooth codec connection procedure between the Bluetooth transmitter-receiver BT1 of the professional desk phone DSKP1 and the Bluetooth transmitter-receiver BT2 of the private cellular phone PECP1.

The mobile call audio is connected to the private cellular phone user agent PEUA1 thanks to the Bluetooth hands-free audio connection BTC. This audio is forwarded to the professional desk phone user agent PLUA thanks to the SIP negotiation, and is connected to the desk phone audio interface AI as for any call via the enterprise communication server CS. The user benefits of the acoustic quality of the professional desk phone DSKP1 to continue the current call. If a colleague calls the user, he/she is seen as busy.

From the communication server CS point of view, this call is represented by the SIP call CALL between the private cellular phone user agent PEUA1 and the professional desk phone user agent PLUA. So, any call evolution can be applied on this call: The professional desk phone DSKP1 can request any service that can be provided by the communication server CS (enterprise directory, second call, transfer of the two calls, conference, etc).

FIG. 2 shows the signaling flow in this exemplary enterprise communication network ECN when it comprises this first embodiment DSKP1 of the phone according to the invention:

Step 1: Initially a user is in conversation on his/her private cell phone PECP1, with a remote caller RC, via a wireless connection RL to a base station BS of the network PLMN. The user is going to his/her office.

Step 2: When the user approaches to the desk phone DSKP1, the user interface of the professional desk phone DSKP1 indicates that a Bluetooth hands-free audio connection can be started for importing a call from a private cell phone to the professional desk phone DSKP1. The user requests the set up of a Bluetooth connection, on the user interface of the professional desk phone DSKP1. This user action also triggers the importation of the mobile communication into the enterprise communication system ECN.

Step 3: The private virtual mobile phone user agent PEUA2 initiates a SIP call to the professional desk phone user agent PLUA, by sending a SIP message INVITE to the communication server CS.

Step 4: Then the communication server CS sends another INVITE message to the professional desk phone user agent PLUA to call the professional desk phone DSKP1. This SIP call is automatically and silently accepted by the professional desk phone user agent PLUA.

Step 5: The professional desk phone user agent PLUA answers the communication server CS by sending a SIP message 200 OK.

Step 6: Then the communication server CS sends a SIP message 200 OK to the private cell phone user agent PEUA1 in order to indicate that a SIP communication CALL has been set up between the user agent PLUA and PEUA1.

Step 7: When it receives this message 200 OK, the desk phone user agent PLUA sends a Bluetooth message AT+BCC to the private cellular phone PECP1. This message requests a Bluetooth audio connection between the Bluetooth transmitter receiver BT2 of the private phone PECP1 and the Bluetooth transmitter receiver BT1 of the professional desk phone DSKP1.

Step 8: The Bluetooth audio connection is set up between the private phone PECP1 and the professional desk phone DSKP1. The private cellular phone PECP1 answers to the professional desk phone DSK1 by a Bluetooth message OK that indicates that a codec connection has been setup.

Step 9: The user continues the mobile call on the professional desk phone DSKP1. The user agent PLUA of the professional desk phone DSK1 is now in audio communication with the remote caller RC, via:
- the SIP communication CALL set up by the communication server CS between the professional desk phone user agent PLUA and the private cellular phone user agent PEUA1,
- the Bluetooth connection BTC between the private cellular phone user agent PEUA1 and the private cellular phone PECP1,
- and the radio link RL between the private cellular phone PECP1 and the base station BS of the mobile network PLMN.

The communication server CS can provide all the possible enterprise communication services to the SIP communication CALL between the two user agents enables the mobile call. As the communication server CS owns the call leg to the private cellular phone user agent PEUA1, it masters the media of the mobile call and permits all possible call evolutions. This solution doesn't involve the mobile operator (no need to subscribe to services as second call, transfer, etc) and it is seamless for the remote caller RC (the communication is never interrupted).

Another possible embodiment uses Wi-Fi for establishing a link between the private cellular phone and the professional desk phone. This link must be proposed to the user only when the user is close to his/her professional desk phone. So this latter must be associated to a WiFi access point that is very close to it, and has not a broad range. A preferred embodiment of the phone according to the invention comprises a WiFi access point embedded in the desk phone.

The private cellular phone must comprise a WiFi adapter. When the user is near the desk phone, he/she requests the private cellular phone to be connected to the WiFi network of the desk phone (the desk phone acts as a Wi-Fi hotspot).

FIG. 3 is a block diagram showing an exemplary enterprise communication network ECN comprising a second embodiment DSKP2 of the phone according to the invention, comprising a WiFi access point AR The second embodiment DSKP2 comprises:
- Classical means VOIPM for establishing a phone call over the Internet protocol, these means comprising a classical audio interface AI, and a desk phone user agent PLUA coupled to the communication server CS and to the classical means VOIPM. It represents the professional desk phone DSKP2 from the communication server CS point of view. All calls at destination of the desk phone are sent to this user agent.
- A WiFi access point WIFI1.
- A private cellular phone back to back user agent PEUA2 coupled to the communication server CS and to the WiFi access point WIFI1. It can represent any private cellular phone as a virtual terminal of the enterprise communication network ECN, from the communication server CS point of view. It also acts as a registrar server for a private cellular phone.

The user of the professional desk phone DSKP2 is also the user of a private cell phone PECP2 comprising:
- A WiFi adapter WIFI2.
- A SIP user agent PEUA3 that can redirect a mobile communication to a SIP communication.

The communication server CS and the professional desk phone DSKP2 use the session initiation protocol (SIP) as a signaling protocol. In this example, the private cellular phone back to back user agent PEUA2 represents the private cellular phone PECP2 that is already on a mobile call.

Initially a user is in conversation on his mobile device PECP2 with a remote caller RC via a radio link RL and a base station BS of the mobile network PLMN. When the user arrives at his/her desk, a WiFi connection with the professional desk phone DSKP2 becomes possible. The user interface of the professional desk phone DSKP2 indicates that a WiFi connection can be established with the WiFi access point WIFI1 of the professional desk phone DSKP2.

The user requests the set up of this WiFi connection. This user's action triggers the importation of the mobile communication in the enterprise communication network ECN. The private cellular phone back to back user agent PEUA2 automatically initiates a SIP call with the desk phone user agent DSKP 2. The SIP call is automatically and silently accepted by the professional desk phone user agent PLUA. So a SIP audio communication is established between the professional desk phone user agent PLUA and the private cellular phone back to back user agent PEUA2. This latter sends a SIP message INVITE to the user agent PEUA3 of the private cellular phone PECP2. This message requests an audio connection between the user agent PEUA2 of the private cell phone PECP2 and the user agent PEUA2 of the professional desk phone DSKP2. The SIP audio communication and the mobile communication are then connected.

Figure 4:
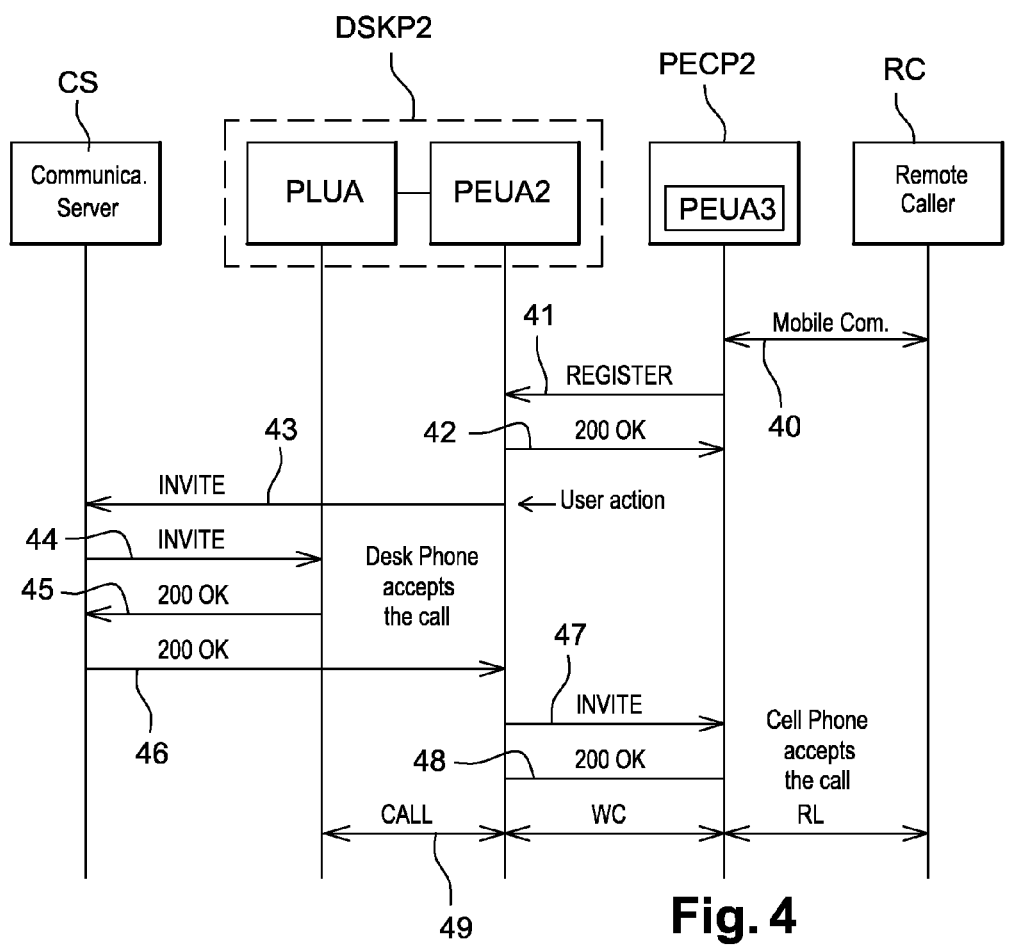
FIG. 4 shows a signaling flow for an exemplary enterprise communication network when it comprises the second embodiment of the phone according to the invention.

FIG. 4 shows a signaling flow in the exemplary enterprise communication network ECN when it comprises this second embodiment DSKP2 of the phone according to the invention:

Step 40: Initially a user is in conversation on his/her private cell phone PECP2, with a remote caller RC, via a wireless connection to a base station BS of the network PLMN. The user is going to his/her office.

Step 41: When the user approaches to the desk phone DSKP2, the user interface of the private cell phone PECP2 indicates that a WiFi connection can be started with the WiFi network based on the access point WIFI2 embedded in the desk phone DSKP2. Thus the user knows that it is now possible to import a call from his/her private cell phone into the enterprise network ECN. The user requests this WiFi connection, on the user interface of the private cell phone PECP2. The private cell phone PECP2 registers at the virtual mobile phone user agent PEUA2 of the professional desk phone DSKP2.

Step 42: The virtual mobile phone user agent PEUA2 of the desk phone DSKP2 answers by sending a SIP message 200 OK to the SIP user agent PEUA3 of the private cell phone PECP2. The interface of the desk phone DSKP2 proposes, to the user, to import the current mobile call from his/her cell phone to the desk phone DSKP2.

Step 43: By an action on the interface of the desk phone DSKP2, the user requests the import of the current mobile call from his/her cell phone to the desk phone DSKP2. Then the virtual mobile phone user agent PEUA2 initiates a SIP call to the professional desk phone user agent PLUA, by sending a SIP message INVITE to the communication server CS.

Step 44: Then the communication server CS sends another SIP message INVITE to the professional desk phone user agent PLUA, to call the professional desk phone DSKP2. This call is automatically accepted by the professional desk phone user agent PLUA.

Step 45: The professional desk phone user agent PLUA answers the communication server CS by sending a SIP message 200 OK.

Step 46: Then the communication server CS sends a SIP message 200 OK to the private cell phone user agent PEUA2 in order to indicate that a SIP communication CALL has been set up between the user agent PLUA and PEUA2.

Step 47: When it receives this message 200 OK, the desk phone user agent PEUA2 sends a SIP message INVITE to the user agent PEUA3 of the private cellular phone PECP2. This message requests an audio connection between the user agent PEUA2 of the private cell phone PECP2 and the user agent PEUA2 of the professional desk phone DSKP2.

Step 48: The user agent PEUA3 of the private cellular phone PECP2 automatically accepts the call. It sends a SIP message 200 OK to the private cell phone user agent PEUA2 of the desk phone DSKP2. An audio connection is set up between the private phone PECP2 and the professional desk phone DSKP2.

Step 49: The user continues the mobile call on the professional desk phone DSKP2. The professional desk phone user agent PLUA is now in audio communication with the remote caller RC, via:
- the SIP connection CALL set up by the communication server CS between the professional desk phone user agent PLUA and the private cellular phone user agent PEUA2,
- the WiFi connection WC between the private cellular phone user agent PEUA2 and the private cellular phone PECP2,
- and the radio link RL to the base station BS of the mobile network PLMN.

The communication server CS can to provide all possible enterprise communication services to the SIP connection CALL between the two user agents PLUA and PEUA3. As the communication server CS owns the call leg to the private cellular phone user agent PEUA3, it masters the media of the mobile call and permits all possible call evolutions.

This solution doesn't involve the mobile operator (no need to subscribe to services as second call, transfer, etc) and it is seamless for the remote caller (the communication is never interrupted).

There is no need to modify or configure the enterprise communication server CS to take into account private cell phones.

There is claimed:

1. An enterprise phone adapted to provide professional services during a communication set up in a mobile network on a private cellular phone, comprising:
    a first user agent coupled to a communication server of an enterprise communication network to represent the enterprise phone as a terminal of the enterprise communication network;
    a classical audio interface coupled to the first user agent;
    a first wireless transmitter-receiver adapted to communicate with a second wireless transmitter-receiver embedded in the private cellular phone; and
    a second user agent coupled to the first wireless transmitter-receiver, the second user agent being coupled to the communication server to represent a private cellular phone as a virtual terminal of the enterprise communication network, the second user agent being adapted to request a set up of a second communication between itself and the first user agent so that a mobile communication already set up on the private cellular phone is connected to the enterprise phone.

2. The enterprise phone according to claim 1, wherein the first and second wireless transmitter-receivers are Bluetooth transmitter-receivers.

3. The enterprise phone according to claim 1, wherein the first and second wireless transmitter-receivers are WiFi transmitter-receivers, and comprising means for sending a SIP message INVITE to a user agent of the private cellular phone, this message requesting an audio connection between the user agent of the private cell phone and the second user agent of the enterprise phone.

4. A desk phone adapted to transfer a mobile communication set up on a private cellular phone over a mobile network to the desk phone, the desk phone comprising:
    a first user agent coupled to a communication server of an enterprise communication network to represent the desk phone as a terminal of the enterprise communication network;
    a classical audio interface coupled to the first user agent;
    a first Bluetooth transmitter-receiver adapted to communicate with a second Bluetooth transmitter-receiver embedded in the private cellular phone; and
    a second user agent coupled to the first Bluetooth transmitter-receiver, the second user agent coupled to the communication server to represent a private cellular phone as a virtual terminal of the enterprise communication network, the second user agent adapted to request a set up of a second communication between itself and the first user agent through the communication server so that a mobile communication already set up on the private cellular phone is connected to the first user agent of the desk phone.

5. A method of transferring a mobile communication set up on a private cellular phone over a cellular network to a desk phone coupled to an enterprise network, the method executed by the desk phone and comprising the steps of:
    notifying a user of the private cellular phone of the availability of a Bluetooth connection with the desk phone;
    activating a Bluetooth connection between a first Bluetooth transmitter-receiver in the desk phone and a second Bluetooth transmitter-receiver in the private cellular phone;
    establishing a call from a private cellular phone user agent to a desk phone user agent through a communication server in the enterprise network; and
    connecting the mobile communication from the private cellular phone to the desk phone user agent using the Bluetooth connection.

* * * * *